United States Patent [19]

Shen et al.

[11] Patent Number: 6,013,771
[45] Date of Patent: Jan. 11, 2000

[54] ISOFLAVONE RICH PROTEIN ISOLATE AND PROCESS FOR PRODUCING

[75] Inventors: Jerome L. Shen, St. Louis; Balagtas F. Guevara, Sunset Hills; Frank E. Spadafora, High Ridge; Barbara A. Bryan, University City, all of Mo.

[73] Assignee: Protein Technologies International, Inc., St. Louis, Mo.

[21] Appl. No.: 09/093,750

[22] Filed: Jun. 9, 1998

[51] Int. Cl.[7] .................................. A23J 1/14; A23L 2/38
[52] U.S. Cl. ..................... 530/378; 530/370; 530/350; 530/412; 530/418; 530/420; 530/427; 426/433; 426/434; 426/598
[58] Field of Search ..................... 530/378, 370, 530/350, 412, 418, 420, 427; 426/433, 434, 598

[56] References Cited

U.S. PATENT DOCUMENTS

| | | | |
|---|---|---|---|
| 5,320,949 | 6/1994 | Shen | 435/68.1 |
| 5,352,384 | 10/1994 | Shen | 252/398 |
| 5,637,561 | 6/1997 | Shen et al. | 514/2 |
| 5,637,562 | 6/1997 | Shen et al. | 514/2 |
| 5,702,752 | 12/1997 | Gugger et al. | 426/634 |
| 5,726,034 | 3/1998 | Bryan et al. | 435/68.1 |
| 5,763,389 | 6/1998 | Shen et al. | 514/2 |
| 5,827,682 | 10/1998 | Bryan et al. | 435/68.1 |

FOREIGN PATENT DOCUMENTS

| | | |
|---|---|---|
| 0647408 | 12/1995 | European Pat. Off. . |
| WO 97/37547 | 10/1997 | WIPO . |

Primary Examiner—Michael P. Woodward
Assistant Examiner—Abdel A. Mohamed
Attorney, Agent, or Firm—Richard B. Taylor

[57] ABSTRACT

A process for providing an isoflavone rich protein isolate is provided, along with the isoflavone rich protein isolate produced thereby. A vegetable material containing protein and at least one isoflavone compound is extracted with an aqueous extractant having a pH above the isoelectric point of the protein, and preferably an alkaline pH. The protein and isoflavones are extracted into the extractant, and the extractant containing the protein and isoflavones is separated from insoluble vegetable protein materials to form a protein extract. The pH of the protein extract is adjusted to about the isoelectric point of the protein to precipitate the protein. The extract containing the precipitated protein is cooled to a temperature of about 40° F. to about 80° F., and then the protein is separated from the extract. Washing of the separated protein is avoided, or, is conducted with minimum amounts of water. The cool separation temperatures and the low wash conditions unexpectedly significantly increase the concentration of isoflavones recovered in the separated protein.

13 Claims, No Drawings

ISOFLAVONE RICH PROTEIN ISOLATE AND PROCESS FOR PRODUCING

BACKGROUND OF THE INVENTION

The present invention relates to an isoflavone enriched vegetable protein isolate and a process for producing the same.

Isoflavones occur in a variety of leguminous plants and oilseeds, including vegetable protein materials such as soybeans. These compounds, for purposes of the present invention, generally include daidzin, 6"-OAc daidzin, 6"-OMal daidzin, daidzein, genistin, 6"-OAc genistin, 6"-OMal genistin, genistein, glycitin, 6"-OMal glycitin, glycitein, biochanin A, and formononetin. As used herein, "Mal" represents "malonyl" and "Ac" represents "acetyl". The structures of these isoflavones are shown in Formulas 1 and 2 below.

Formula 1

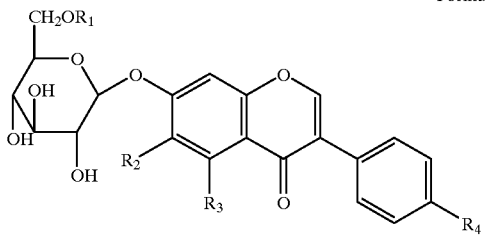

| Compound | $R_1$ | $R_2$ | $R_3$ | $R_4$ |
| --- | --- | --- | --- | --- |
| Genistein | OH | H | OH | OH |
| Daidzein | OH | H | H | OH |
| Glycitein | OH | $OCH_3$ | H | OH |
| Biochanin A | OH | H | OH | $OCH_3$ |
| Formononetin | OH | H | H | $OCH_3$ |

Formula 2

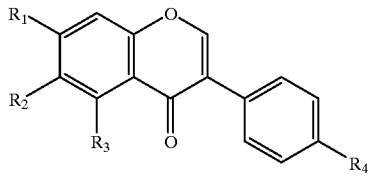

| Compound | $R_1$ | $R_2$ | $R_3$ | $R_4$ |
| --- | --- | --- | --- | --- |
| Genistin | H | H | OH | OH |
| 6"-OMal genistin | $COCH_2CO_2H$ | H | OH | OH |
| 6"-OAc genistin | $COCH_3$ | H | OH | OH |
| Daidzin | H | H | H | OH |
| 6"-OMal daidzin | $COCH_2CO_2H$ | H | H | OH |
| 6"-OAc daidzin | $COCH_3$ | H | H | OH |
| Glycitin | H | $OCH_3$ | H | OH |
| 6"-OMal glycitin | $COCH_3$ | $OCH_3$ | H | OH |

It has recently been recognized that the isoflavones contained in vegetable proteins such as soybeans may inhibit the growth of human cancer cells, such as breast cancer cells and prostate cancer cells, as described in the following articles: "Genistein Inhibition of the Growth of Human Breast Cancer Cells: Independence from Estrogen Receptors and the Multi-Drug Resistance Gene" by Peterson and Barnes, *Biochemical and Biophysical Research Communications*, Vol. 179, No.1 p. 661–667, Aug. 30, 1991; Genistein and Biochanin A Inhibit the Growth of Human Prostate Cancer Cells but not Epidermal Growth Factor Receptor Tyrosine Autophosphorylation" by Peterson and Barnes, *The Prostate* 22: 335–345 (1993); and "Soybeans Inhibit Mammary Tumors in Models of Breast Cancer" by Barnes et al. *Mutagens and Carcinogens in the Diet* p. 239–253 (1990). These isoflavones also have been found to reduce cardiovascular risk factors, for example by reducing the levels of atherosclerosis inducing lipoproteins and low density cholesterol and by increasing endothelial dependent vasodilation response.

Typically these isoflavone compounds have been associated with an inherent, bitter flavor in vegetable protein materials such as soybeans. In the commercial production of such protein materials, such as protein isolates and protein concentrates, the focus has been to remove these isoflavone compounds. For example, in a conventional process for the production of a soy protein isolate, soy flakes are extracted with an aqueous medium having a pH above the isoelectric point of the protein to solubilize the protein. The extract containing the protein is separated from insoluble fiber materials to provide a protein extract. The isoflavones are solubilized in the extract as well as the protein. The protein is precipitated by adjusting the pH of the extract to about the isoelectric point of the protein with an acid. The precipitated protein is then separated from the extract. Much of the isoflavones remain solubilized in the extract following separation of the precipitated protein (curd) from the extract. After separation of the precipitated protein curd from the extract, the extract and the isoflavones solubilized therein are usually discarded. Residual isoflavones left in the separated protein are usually removed by exhaustive washing of the protein to ensure that the taste associated with the isoflavones is not present in the protein.

It is desirable, however, to provide an isoflavone rich protein material, and a process for producing the same, which is suitable for administration in a diet. Such an isoflavone rich protein material can be used to provide the nutritional benefits of the protein and the health benefits of the isoflavones when administered in a diet.

SUMMARY OF THE INVENTION

The present invention is a process for producing an isoflavone rich protein material, and the resulting isoflavone rich protein material. A vegetable material containing protein and isoflavones is extracted with an aqueous extractant having a pH above the isoelectric point of the protein material, and the extractant is separated from insoluble vegetable materials to produce an extract containing isoflavones and protein. The pH of the extract is adjusted to about the isoelectric point of the protein material to precipitate a protein curd containing isoflavones. The protein curd is separated from the extract at a temperature of about 30° F. to about 90° F., and washing of the separated protein curd is avoided to produce the isoflavone rich protein material.

In another aspect the present invention is a process similar to that described above, except that the separated protein curd is washed with water. In a preferred embodiment, the separated protein curd is washed with water in an amount by weight which is less than about four times the weight of the initial vegetable material, and more preferably, less than about two times the weight of the initial vegetable material. In another preferred embodiment, the water used to wash the separated protein curd has a temperature of about 30° F. to about 90° F.

The isoflavones isolated in the protein material according to the present invention include daidzin, 6"-OMal daidzin, 6"-OAc daidzin, daidzein, genistin, 6"-OMal genistin, 6"-OAc genistin, genistein, glycitin, 6"-OMal glycitin, glycitein, biochanin A, formononetin, and mixtures thereof.

The isoflavone content of a protein material separated from a vegetable protein source using a process of the present invention is significantly higher than that of a protein material separated from a vegetable protein source using a conventional protein separation process. First, either avoiding washing the separated protein material with water, or using limited amounts of water to wash the separated protein increases the amount of isoflavones retained in the protein material relative to a conventional process in which the separated protein material is extensively washed.

Second, separation of the precipitated protein material from the extract at cool or cold temperatures unexpectedly significantly increases the amount of isoflavones trapped in the separated protein material. In a conventional process precipitated protein is separated from the extract at temperatures above about 90° F., typically about 130° F. to about 150° F., to maximize the yield of protein recovered in the separation. It has been found, however, that cool or cold separation of the protein material at temperatures below 90° F. greatly increases the amount of the desired isoflavones recovered in the protein material.

DESCRIPTION OF THE PREFERRED EMBODIMENTS

Although the present invention will be described with respect to soybean materials, and the process is particularly suited for production of an isoflavone rich protein isolate from soybean materials, nevertheless, the present process is generally applicable to the production of protein isolates from a variety of vegetable protein sources which contain isoflavones. Other vegetable protein sources which contain isoflavones which may be used in the process of the present invention include, but are not limited to, one or more of the following plant materials: chick pea, ground pea, marama bean, sword bean, jack bean, seaside sword bean, caraobean, cluster bean, hyacinth bean, grass pea, garden pea, djenko bean, goa bean, yam bean, broad bean, earth pea, lentil, jumping bean, velvet bean, African locust bean, and derivatives of such plant materials.

A soybean starting material for the process of the present invention is a soybean material containing soy protein and isoflavones such as soy flakes, soy meal, and soy flour. The isoflavone compounds contained in the soybean starting material typically include genistin, 6"-OMal genistin, 6"-OAc genistin, genistein, daidzin, 6"-OMal daidzin, 6"-OAc daidzin, daidzein, glycitin, 6"-OMal glycitin, and glycitein, shown in Formulas 1 and 2 above. Before using the starting material in the process of the present invention, if desired, the soybean starting material may be modified to adjust the isoflavone content in the starting material, for example by conversion of the isoflavone conjugates and isoflavone glucosides of Formula 2 to the more biologically active aglucone isoflavones of Formula 1 by enzymatic conversion.

The preferred starting material for the process of the invention is soy flakes from which the oil has been removed by solvent or mechanical extraction and which may be produced from soybeans according to conventional processes. The process of the invention will be described with respect to a soy flake starting material, although other soy protein and vegetable protein containing starting materials may be used in place of the described soy flakes.

Initially, the flakes are extracted with an aqueous extractant having a pH above about the isoelectric point of the protein material in the flakes to extract the protein and isoflavones from the flakes. The pH of the aqueous extractant preferably is not high enough to cause the protein material to deteriorate, and typically ranges from about the isoelectric point of the protein to about pH 10.0, preferably about pH 6.0 to about pH 10.0, more preferably about pH 6.7 to about pH 9.7. Most preferably the pH of the aqueous extractant is selected to be as high as possible without causing the formation of detrimental substances such as lysinoalanine from the protein material, preferably from about pH 9.5 to about pH 10.0, since the protein material is most readily solubilized in highly alkaline aqueous solutions. Typical alkaline reagents may be employed, if needed, to elevate the pH of the aqueous extractant including sodium hydroxide, potassium hydroxide, and calcium hydroxide.

The desired isoflavone compounds are solubilized in the extract along with the protein, and, in order to maximize recovery of these compounds in the aqueous extract, the weight ratio of extractant to flakes is preferably controlled to specific levels in order to solubilize as much of the isoflavones and protein from the vegetable protein source as is possible. Extraction of the proteins and isoflavones can be carried out in a variety of ways including countercurrent extraction of the flakes, preferably at a weight ratio of extractant to flakes of about 5:1 to about 16:1, in which the initial extract is used to reextract the flakes to provide an aqueous extract of protein and isoflavones. Alternatively, a two-step extraction process can be used, preferably in which the weight ratio of extractant to flakes in an initial step is about 8:1 to about 10:1, and a second extraction of the flakes with fresh extractant is effected at a weight ratio of extractant to flakes of about 3:1 to about 6:1 so that the combined weight ratio of the extractant to flakes in both steps does not exceed a total weight ratio of extractant to flakes of about 11:1 to about 16:1.

Although not critical, the extraction may be carried out at temperatures up to about 120° F., preferably at about 90° F., for a period of time of about 5 minutes to about 60 minutes, and preferably for about 15 minutes.

The aqueous extractant containing the protein material and isoflavones is then separated from the insoluble vegetable materials. The extract may be separated from the insoluble vegetable materials by conventional liquid/solid separation processes such as filtration or centrifugation. In a preferred embodiment, the protein/isoflavone extract is separated from the insoluble materials by centrifuge, and the extract is collected as the supernatant.

The pH of the resulting aqueous protein extract containing isoflavones is then adjusted to about the isoelectric point of the protein with an edible acid to precipitate an isoflavone containing protein material to enable the protein material to be separated from other water soluble materials extracted from the vegetable material such as carbohydrates and ash. The isoelectric point for soy protein is generally between about pH 4.0 to about 5.0, and more specifically between a pH of about 4.4 to about 4.6. The edible acid added to adjust the pH of the extract to about the isoelectric point of the protein may be any suitable edible acid such as acetic acid, sulfuric acid, phosphoric acid, and hydrochloric acid.

Acid precipitation of the protein in the extract separates the extract into two phases, one phase being the precipitated protein curd, and the other phase being the aqueous whey. The protein curd is separated from the whey to form a protein isolate. Conventionally, the protein is separated from the whey at temperatures above 90° F., usually about 130° F. to about 150° F., to maximize the yield of the protein material in the separation step.

The inventors of the present invention have discovered that separation of the protein curd from the whey under cool or cold conditions can unexpectedly significantly increase the amount of isoflavones captured in the separated protein material. The inventors have found that the total amount of isoflavones recovered in the protein increases as the temperature at which the separation of the protein curd and whey is effected decreases. Preferably, the protein curd is separated from the extract at a temperature below about 90° F., typically from about 30° F. to about 90° F., more preferably from about 40° F. to about 80° F., and most preferably from about 50° F. to about 70° F.

The inventors have also discovered that holding the precipitated protein material at these cool or cold conditions for a period of time prior to separation from the extract can also increase the amount of isoflavones captured in the protein material. The amount of isoflavones captured in the protein material increases with time for a limited time period, typically up to about 1 hour, when the precipitated protein material is held at cool or cold temperatures prior to being separated from the extract at the cool or cold temperatures. Preferably the precipitated protein material is held in the extract prior to separation for at least 30 minutes, and more preferably for about 1 hour, at the cool or cold temperatures at which the protein material is to be separated from the extract.

The aqueous extract containing the protein material may be adjusted to the cool or cold temperatures suitable for separating an isoflavone rich protein material at any time after the protein material is extracted from the vegetable protein source and prior to separation of the precipitated protein material from the extract. For example, the temperature of the extract may be adjusted to the cool or cold separation temperatures prior to adjusting the pH of the extract to about the isoelectric point of the protein with an acid, or after acid precipitation of the protein material and prior to separation of the precipitated protein material from the extract.

The temperature of the extract may be adjusted, if necessary, to cool the extract to the desired separation temperature by conventional means prior to separating the protein material from the extract. For example, in a large scale commercial process the extract may be passed through a heat exchanger to cool the extract, or in a small scale process the extract may be refrigerated or placed in an ice bath to cool the extract.

The separation may be effected using conventional means for separating solid materials from liquids. Preferably, the isoflavone containing protein material is separated by centrifugation, most preferably utilizing a refrigerated centrifuge. Other separation processes can be utilized as well, such as filtration of the protein material from the extract.

The separated isoflavone rich protein material may be dewatered, or alternatively, the separated isoflavone rich protein material may be washed with water and then dewatered. The dewatered isoflavone rich protein material is preferably an isoflavone rich protein isolate (a protein material containing at least 90% protein).

Preferably, washing of the separated protein material is avoided entirely to avoid washing the isoflavones from the protein. If separated protein material is washed, it is preferred to minimize the extent of washing to substantially reduce removal of the isoflavones from the protein. Avoiding or minimizing the washing of the precipitated protein material can more than double the recovery of isoflavones in the protein compared to a protein isolate formed in accordance with a conventional protein isolate forming process in which the protein material is extensively washed after separation from the extract.

If the protein material is washed, it is preferred that the wash be limited to a single wash with a minimum amount of water. More preferably, if the protein material is to be washed, the wash should be a single wash in which the weight of wash water is from about two to four times the weight of the intial vegetable material. Further, it is preferred that the temperature of the wash water be cool or cold, preferably from about 30° F. to about 90° F., to minimize the amount of isoflavones removed in the wash.

After separation of the isoflavone rich protein material from the extract, and any washing of the protein material, the protein material is dewatered in a conventional manner. Preferably the protein material is dewatered by centrifugation or concentration, or a combination thereof. The dewatered protein material is then dried using conventional drying techniques, preferably spray drying, to form a dry isoflavone rich protein material.

The dry isoflavone rich protein material contains elevated levels of isoflavones relative to protein materials prepared conventionally. The isoflavone rich protein material may contain at least 1.5 mg/g of isoflavones structurally related to genistein which are derived from the vegetable extract, specifically genistein, genistin, 6"-OMal genistin, and 6'Oac genistin. The isoflavone rich protein material also may contain at least 0.8 mg/g of isoflavones structurally related to daidzein, specifically daidzein, daidzin, 6"-OMal daidzin, and 6"-OAc daidzin. Preferably the isoflavone rich protein material contains from about 1.5 mg/g to about 3.5 mg/g of the isoflavones related to genistein and from about 0.8 mg/g to about 3.5 mg/g of the isoflavones related to daidzein. Most preferably, the isoflavone rich protein material contains from about 1.8 mg/g to about 10 mg/g of the isoflavones related to genistein, and from about 1.5 mg/g to about 10 mg/g of the isoflavones related to daidzein, and contains from about 3.5 to about 25 mg/g total isoflavones.

The isoflavone rich protein material can be incorporated in a variety of foods to provide the nutritional benefits of the protein and the health benefits of the isoflavones. For example, the isoflavone rich protein material can be used in the following foods: meats, particularly emulsified meats and ground meats; beverages, such as nutritional beverages, sports beverages, protein fortified beverages, juices, milk, milk alternatives, and weight loss beverages; cheeses, such as hard and soft cheeses, cream cheese, and cottage cheese; frozen desserts, such as ice cream, ice milk, low fat frozen desserts, and non-dairy frozen desserts; yogurts; soups; puddings; bakery products; salad dressings; and dips and spreads such as mayonnaise and chip dips. The foods listed above in which the isoflavone rich protein material may be utilized are given as examples, and are not intended to be an exhaustive list of the foods in which the isoflavone rich protein material may be used. The isoflavone rich protein material may be incorporated into any particular food in which protein materials are conventionally incorporated in accordance with conventional processes for incorporating a protein material into the particular food type.

The following non-limiting formulations illustrate dietary supplements that may be formed using an isoflavone rich soy protein material formed in accordance with the process of the present invention. The isoflavone rich soy protein material in the following formulations typically contains between about 2.5 to about 20.5 milligrams of the isoflavone compounds of Formulas 1 and 2 per gram of soy protein.

FORMULATIONS

Formulation 1

Ready to drink beverage

A ready to drink beverage may be formed of the following components:

| Ingredient | Percent of composition, by weight |
|---|---|
| Water | 80–85 |
| Isoflavone rich isolated soy protein | 10–15 |
| Sucrose | 5–8 |
| Cocoa | 0.1–1 |
| Vitamins/Minerals | 0.1–1 |
| Flavor | 0.1–1 |
| Cellulose gel | 0.1–0.5 |

The ready to drink beverage may be served in 8 ounce servings containing about 20 grams of isolated soy protein including about 52 to about 455 milligrams of the isoflavone compounds.

Formulation 2

Powdered beverage

A powdered beverage may be formed of the following components:

| Ingredient | Percent of composition, by weight |
|---|---|
| Isoflavone rich isolated soy protein | 85–90 |
| Sucrose | 8–15 |
| Maltodextrin | 1–5 |
| Vitamins/Minerals | 0.5–2 |
| Aspartame | 0–0.5 |
| Flavor | 0–0.5 |

30 grams of the powdered beverage formulation may be added to water to form a serving containing about 20 grams of isolated soy protein including about 52 to about 455 milligrams of the isoflavone compounds.

Formulation 3

Food bar

A food bar may be formed of the following components:

| Ingredient | Percent of composition, by weight |
|---|---|
| Isoflavone rich isolated soy protein | 20–30 |
| Corn syrup | 35–45 |
| Rice syrup solids | 7–14 |
| Glycerin | 1–5 |
| Cocoa | 2–7 |
| Compound coating | 15–25 |

The food bar may be served in 70 gram portions containing about 15 grams of soy protein having about 40 to about 345 milligrams of the isoflavone compounds therein.

Formulation 4

Soy yogurt

A soy yogurt may be formed of the following compents:

| Ingredient | Percent of composition, by weight |
|---|---|
| Water | 65–75 |
| Isoflavone rich isolated soy protein | 5–15 |
| Sucrose | 3–8 |
| Corn starch | 1–5 |
| Dextrin | 0.3–1 |
| Cellulose gel | 1–3 |
| Culture (yogurt) | 0.01–0.1 |
| Fruit | 10–20 |
| Vitamins/Minerals | 0.05–0.3 |

The soy yogurt may be served in a 170 gram serving containing about 8 grams of soy protein having about 20 to about 185 milligrams of isoflavone compounds therein.

The following examples are provided to illustrate the present invention. In the examples, "genistin" is defined to include the aglucone isoflavone genistein, and the isoflavone glucoside conjugates 6"-OMalonyl genistin and 6"-OAcetyl genistin, as well as the isoflavone glucoside genistin. "Daidzin" is defined in the examples to include the aglucone isoflavone daidzein, and the isoflavone glucoside conjugates 6"-OMalonyl daidzin and 6"-OAcetyl daidzin, as well as the isoflavone glucoside daidzin. The examples are not to be interpreted as limiting the scope of the invention.

EXAMPLE 1

In order to illustrate the increased levels of isoflavones in protein isolates produced by minimizing the washing of a protein isolate, a conventional protein isolate and procedure for producing the same is first completed to show recovery of the desired isoflavones in a conventional process. 100 lbs. of defatted soybean flakes are placed in an extraction tank and extracted with 1,000 lbs. of water heated to 90° F. to which sufficient calcium hydroxide is added to adjust the pH to 9.7. This provides a weight ratio of water to flakes of 10:1. The flakes are separated from the extract and reextracted with 600 lbs. of aqueous extract having a pH of 9.7 and a temperature of 90° F. This second extraction step provides a weight ratio of water to flakes of 6:1. The flakes are removed by centrifugation, and the first and second extracts are combined and adjusted to a pH of 4.5 with hydrochloric acid to precipitate a protein curd. The acid precipitated curd is separated from the extract by centrifugation, leaving an aqueous whey, and then is washed with water in a weight amount of seven times that of the starting flake material to provide a protein isolate. The protein isolate, whey, spent flakes, and starting material are analyzed for "genistin" and "daidzin" content. The results are shown in Table 1 below as a concentration of isoflavones and also as a percentage recovery of the isoflavones relative to the amount of isoflavones contained in the starting material.

TABLE 1

| Material | Level (mg/g dry basis) | | % Recovery | |
|---|---|---|---|---|
| | Genistin | Daidzin | Genistin | Daidzin |
| Protein Isolate | 0.90 | 0.54 | 23 | 15 |
| Whey | 3.24 | 3.30 | 75 | 83 |
| Spent Flakes | 0.21 | 0.19 | 2 | 2 |
| Starting Material | 1.72 | 1.58 | — | — |

The above example clearly illustrates that in a conventional process the desired isoflavones are mostly concentrated in the whey, which results in low levels of isoflavones in most commercial protein isolates.

EXAMPLE 2

The effect of avoiding washing of the protein isolate on the concentration of isoflavones in the isolate is measured. 100 lbs. of defatted soybean flakes are placed in an extraction tank and extracted in a continuous two-stage countercurrent procedure with 800 lbs. of water heated to 90° F. to which sufficient calcium hydroxide is added to adjust the pH to 9.7. This provides a weight ratio of water to flakes of 8:1. The flakes are removed by centrifugation, and the aqueous extract adjusted a pH of 4.5 to precipitate the protein, which is then separated from the whey by centrifugation. Washing of the separated curd is avoided. The curd, whey, spent flakes, and starting material are analyzed in the same manner as set forth in Example 1. The results are shown in Table 2.

TABLE 2

|  | Level (mg/g dry basis) | | % Recovery | |
| --- | --- | --- | --- | --- |
| Material | Genistin | Daidzin | Genistin | Daidzin |
| Curd (isolate) | 2.31 | 1.59 | 59 | 44 |
| Whey | 1.68 | 2.11 | 39 | 53 |
| Spent Flakes | 0.21 | 0.28 | 2 | 3 |
| Starting Material | 1.72 | 1.58 | — | — |

As shown by comparison with the isolate in Example 1, the concentration and recovery of the desired isoflavones in the recovered protein isolate are substantially increased compared to the isoflavone concentrations and recovery in a protein isolate prepared in accordance with a conventional process.

EXAMPLE 3

The effect of minimally washing a protein isolate on the concentration of the isoflavones in the isolate is measured. The acid precipitated curd is prepared as described in Example 2 except that following acid precipitation the curd is washed with ambient temperature water equal to a weight ratio of two times the weight of the starting flake material. The resulting protein isolate, whey, spent flakes, and starting material are analyzed in the same manner as set forth in Example 1. The results are shown in Table 3 below.

TABLE 3

|  | Level (mg/g dry basis) | | % Recovery | |
| --- | --- | --- | --- | --- |
| Material | Genistin | Daidzin | Genistin | Daidzin |
| Protein Isolate | 2.03 | 1.37 | 52 | 38 |
| Whey | 1.94 | 2.35 | 45 | 59 |
| Spent Flakes | 0.31 | 0.28 | 3 | 3 |
| Starting Material | 1.72 | 1.58 | — | — |

As shown by comparison with the isolate in Example 1, the concentration and recovery of the desired isoflavones in the recovered protein isolate are substantially increased compared to the isoflavone concentrations and recovery in a protein isolate prepared in accordance with a conventional process.

EXAMPLE 4

The effect of washing a protein isolate with a reduced amount of water relative to a conventional process for producing an isolate on the concentration of the isoflavones in the isolate is measured. The acid precipitated curd is prepared as described in Example 2 except that following acid precipitation the curd is washed with ambient temperature water equal to a weight ratio of four times the weight of the starting flake material. The resulting protein isolate, whey, spent flakes, and starting material are analyzed in the same manner as set forth in Example 1. The results are shown in Table 4 below.

TABLE 4

|  | Level (mg/g dry basis) | | % Recovery | |
| --- | --- | --- | --- | --- |
| Material | Genistin | Daidzin | Genistin | Daidzin |
| Protein Isolate | 1.80 | 1.12 | 46 | 31 |
| Whey | 2.20 | 2.63 | 51 | 66 |
| Spent Flakes | 0.31 | 0.28 | 3 | 3 |
| Starting Material | 1.72 | 1.58 | — | — |

As shown by comparison with isolate of Example 1, the concentration and recovery of the desired isoflavones in the isolated protein are increased compared the isoflavone concentrations and recovery in a protein isolate prepared in accordance with a conventional process.

EXAMPLE 5

The effect of separating a protein isolate from a protein extract at a relatively cool temperature is measured, where the separated protein isolate is washed with an amount of water in accordance with conventional processes for producing protein isolates.

725 g of defatted soy flakes are extracted with alkaline water adjusted to a pH of 9.7 with sodium hydroxide and having a temperature of 90° F., where the ratio of the alkaline extraction water to flakes is 10:1. The flakes are separated from the extractant and are reextracted with a second volume of alkaline water having a pH of 9.7, where the weight ratio of water to flakes is 6:1. The flakes are removed by centrifugation and the first and second extracts are combined. The combined extract is then cooled to 38° F., and the pH of the extract is adjusted to 4.5 with hydrochloric acid to precipitate a protein curd. The protein curd is separated from the extract at 38° F. by centrifugation, leaving an aqueous whey. The separated curd is then washed with 55° F. water in a weight amount of nine times that of the starting flake material to provide a protein isolate. The protein isolate, whey, and starting material are analyzed in the same manner set forth in Example 1. The results are shown in Table 5 below.

TABLE 5

|  | Level (mg/g dry basis) | | % Recovery | |
| --- | --- | --- | --- | --- |
| Material | Genistin | Daidzin | Genistin | Daidzin |
| Starting Material | 2.08 | 2.11 | — | — |
| Curd (isolate) | 3.07 | 2.31 | 63 | 49 |
| Whey | 1.68 | 2.93 | 27 | 48 |

As shown by comparison with the isolate in Example 1, the relative concentration and percent recovery of the desired isoflavones in the protein isolate separated from the whey at cool temperatures are substantially increased compared to the isoflavone concentrations and recovery in a protein isolate prepared in accordance with a conventional process.

EXAMPLE 6

The effect on isoflavone recovery and concentration in a protein curd is measured when the protein curd is separated from a protein extract at a relatively cool temperature and washing the separated protein material is avoided.

725 g of defatted soy flake starting material is extracted with alkaline water adjusted to a pH of 9.7 with calcium hydroxide and having a temperature of 90° F., where the ratio of the alkaline extraction water to soy flake starting material is 10:1 by weight. The flakes are separated from the extractant and are reextracted with a second volume of alkaline water having a pH of 9.7, where the weight ratio of water to flakes is 6:1. The spent flakes are removed from the second extract by centrifugation, and the first and second extracts are combined. The combined extract is then cooled to 38° F. and the pH of the extract is adjusted to 4.5 with hydrocholoric acid to precipitate a protein curd. The protein curd is separated from the extract at 38° F. by centrifugation, leaving an aqueous whey. Washing the separated protein curd is avoided. The protein curd, whey and starting material are analyzed in the same manner set forth in Example 1. The results are shown in Table 6.

TABLE 6

| | Level (mg/g dry basis) | | % Recovery | |
|---|---|---|---|---|
| Material | Genistin | Daidzin | Genistin | Daidzin |
| Starting Material | 2.08 | 2.11 | — | — |
| Curd (isolate) | 3.07 | 2.31 | 63 | 49 |
| Whey | 1.68 | 2.93 | 27 | 48 |

As shown by comparison with the isolate in Example 1, the relative concentration and percent recovery of the desired isoflavones in the protein curd separated from whey at cool temperatures with no subsequent washing is greatly increased relative to the isoflavone concentrations and recovery in a protein curd separated in accordance with a conventional protein isolate forming process.

EXAMPLE 7

The effect on isoflavone recovery and concentration in a protein curd is measured when the protein curd is separated from a protein extract at a relatively cool temperature and the separated curd is only minimally washed.

50 g of defatted soy flakes are extracted with alkaline water adjusted to a pH of 9.7 with sodium hydroxide at a temperature of 100° F., where weight ratio of water to flakes is 10:1. The flakes are separated from the extractant and are reextracted with a second volume of alkaline water having a pH of 9.7, where the weight ratio of water to flakes is 3:1. The flakes are removed from the second extract by centriftigation and the first and second extracts are combined. The combined extract is then cooled to 45° F., and the pH of the extract is adjusted to 4.5 with hydrochloric acid to precipitate a protein curd. The protein curd is held in the extract for two hours at 45° C. and then is separated from the extract at 45° F. by centrifugation, leaving an aqueous whey. The separated protein curd is washed with 45° F. water in a weight amount of water to starting flake material of 2:1 to provide a protein isolate. The protein isolate, whey and starting material are analyzed for "genistin" and "daidzin" content as set forth in Example 1. The results are shown in Table 7 below.

TABLE 7

| | Level (mg/g dry basis) | | % Recovery | |
|---|---|---|---|---|
| Material | Genistin | Daidzin | Genistin | Daidzin |
| Starting Material | 1.58 | 0.82 | — | — |
| Protein Isolate | 2.00 | 0.95 | 50 | 37 |
| Whey | 2.66 | 2.94 | 42 | 55 |

As shown by comparison with the isolate in Example 1, the relative concentration and percent recovery of the desired isoflavones in the protein isolate separated from whey at cool temperatures with minimal subsequent washing is substantially increased relative to the isoflavone concentrations and recovery in a protein isolate formed in accordance with a conventional protein isolate forming process.

EXAMPLE 8

The effect on isoflavone recovery in a protein curd of increasing the time that the precipitated protein curd is held at cool temperatures prior to being separated from the aqueous whey from which it was precipitated is measured.

A precipitated protein curd is prepared from a soy flake material in the same manner as set forth in Example 1. Prior to separation of the precipitated protein curd from the aqueous extract from which it was precipitated, the precipitated protein/extract slurry is cooled to 60° F. The protein/extract slurry is held at 60° F. for a period of 1.5 hours, during which samples of the protein material are separated from the slurry at 0 hour, 0.5 hour, and 1 hour. A final sample is taken at 1.5 hour by separating the precipitated protein from the aqueous whey at 60° F. The isoflavone content of the samples is measured, and the percentage recovered in the curd is shown in Table 8 below.

TABLE 8

| Percent of isoflavones captured by protein curd | | |
|---|---|---|
| Time Held at 60° F. | % Genistin | % Daidzin |
| t = 0 hour | 81 | 66 |
| t = 0.5 hour | 83 | 67 |
| t = 1.0 hour | 86 | 70 |
| t = 1.5 hour | 86 | 70 |

As shown in the above example, the isoflavone recovery in the protein curd increases as the time that the protein curd was held at relatively cool temperatures prior to separation from the whey is increased in the first hour that the curd is held at cool temperatures.

It is to be understood that the foregoing are merely preferred embodiments of the invention and that various changes and alterations can be made without departing from the spirit and broader aspects thereof as set forth in the appended claims, which are to be interpreted in accordance with the principles of patent law including the Doctrine of Equivalents.

What is claimed is:

1. A process for producing an isoflavone rich protein material, comprising:

extracting a vegetable material containing protein and at least one isoflavone compound with an aqueous extractant having a pH above the isoelectric point of the protein and separating said extractant from insoluble vegetable materials to produce an extract containing said isoflavone(s) and said protein;

adjusting the pH of the extract to about the isoelectric point of said protein to precipitate a protein material containing at least one isoflavone compound; and separating said protein material from said extract at a temperature of about 40° F. to about 80° F. and avoiding washing of said separated protein material.

2. The process set forth in claim 1 wherein said aqueous extractant has a pH of about 9 to about 10.

3. The process set forth in claim I wherein said vegetable material is a soy material.

4. The process set forth in claim 1 wherein said vegetable material contains at least one isoflavone compound selected from the group consisting of genistein, genistin, 6"-OMal genistin, 6"-OAc genistin, daidzein, daidzin, 6"-OMal daidzin, 6"-OAc daidzin, glycitein, glycitin, 6"-OMal glycitin, formononetin, biochanin A, or a mixture thereof.

5. The process set forth in claim 1 wherein said protein material is separated from said extract at a temperature of about 50° F. to about 70° F.

6. A process for producing an isoflavone rich protein material, comprising:

extracting a vegetable material containing protein and at least one isoflavone compound with an aqueous extractant having a pH above about the isoelectric point of said protein and separating said extractant from insoluble vegetable materials to produce an extract containing said isoflavone(s) and said protein;

adjusting the pH of the extract to about the isoelectric point of said protein to precipitate a protein material containing at least one isoflavone compound;

separating said protein material from said extract at a temperature of about 40° F. to about 80° F.; and washing said separated protein material with water.

7. The process set forth in claim 6 wherein the protein material is washed with water in an amount by weight which is less than about four times the weight of said vegetable material.

8. The process set forth in claim 6 wherein the protein material is washed with water in an amount by weight which is less than about two times the weight of said vegetable material.

9. The process set forth in claim 6 wherein the water used to wash the protein material has a temperature of about 50° F. to about 70° F.

10. The process set forth in claim 6 wherein said aqueous extractant has a pH of about 9 to about 10.

11. The process set forth in claim 6 wherein said vegetable protein material is a soy material.

12. The process set forth in claim 6 wherein said vegetable material contains at least one isoflavone selected from the group consisting of genistein, genistin, 6"-OMal genistin, 6"-OAc genistin, daidzein, daidzin, 6"-OMal daidzin, 6"-OAc daidzin, glycitein, glycitin, 6"-OMal glycitin, formononetin, biochanin A, or a mixture thereof.

13. The process set forth in claim 6 wherein said protein material is separated from said extract at a temperature of about 50° F. to about 70° F.

* * * * *